M. McCOOL.

Improvement in Sawing-Machines.

No. 132,016. Patented Oct. 8, 1872.

UNITED STATES PATENT OFFICE.

MICHAEL McCOOL, OF MOUNDSVILLE, WEST VIRGINIA.

IMPROVEMENT IN SAWING-MACHINES.

Specification forming part of Letters Patent No. 132,016, dated October 8, 1872.

*To all whom it may concern:*

Figure 1:
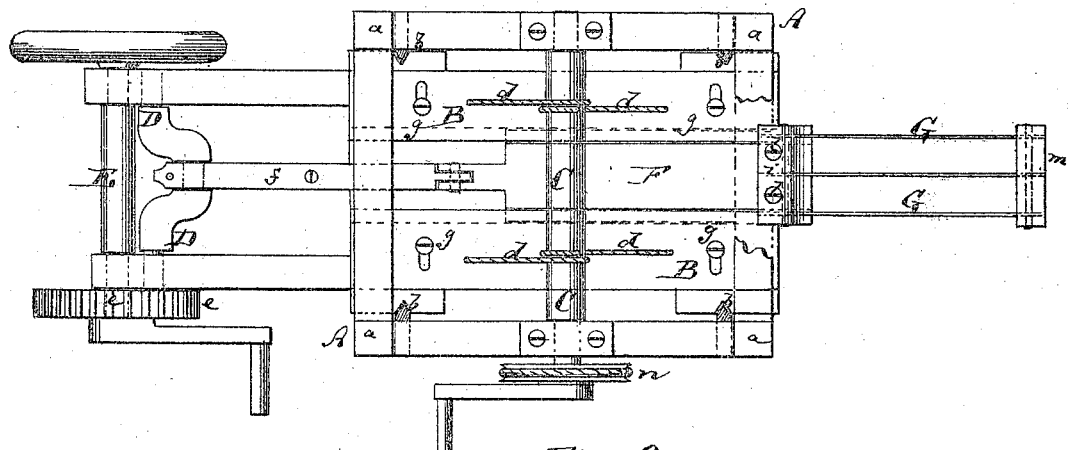
Figure 2:
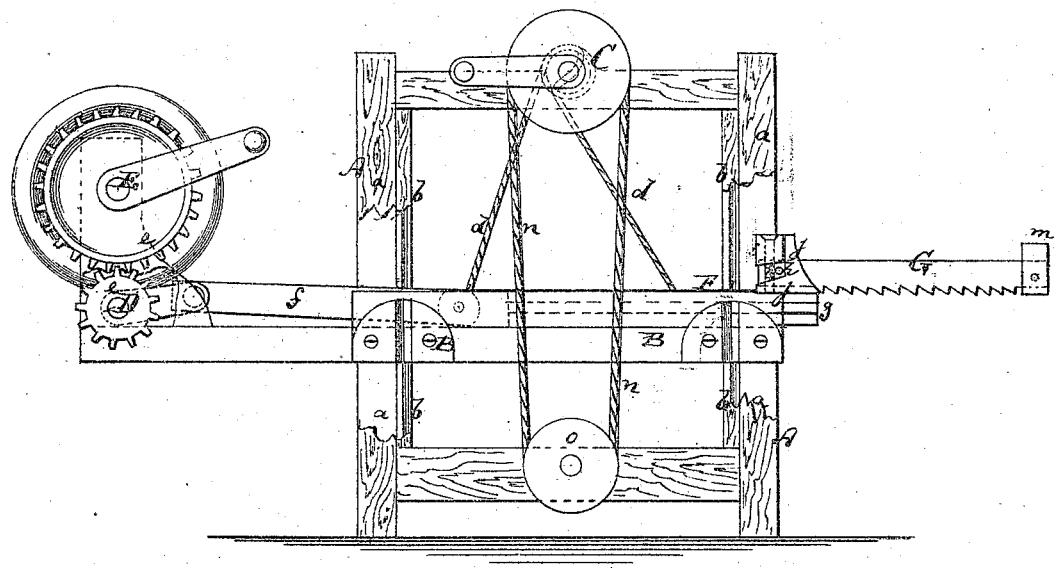

Be it known that I, MICHAEL McCOOL, of Moundsville, in the county of Marshall and State of West Virginia, have invented a new and useful Improvement in Sawing-Machines, of which the following is a specification:

Figure 1 is a top view, and Fig. 2 a side view, of my improved sawing-machine.

Similar letters of reference indicate corresponding parts.

This invention relates to a new sawing-machine for cross-cutting, ripping, and other purposes; and consists in a new manner of fastening the saws in the carriage.

A in the drawing represents the outer or main supporting-frame of the sawing-machine. It is made of suitable size and material, and contains four uprights or posts, $a\ a$, between which a vertically-adjustable frame, B, is held. The posts $a$ have ribs $b$ or equivalent guides for the frame B, so that the latter in moving up and down will be properly steadied. C is a windlass hung in the upper part of the frame A and connected by ropes or chains $d\ d$ with the frame B, which is by these ropes or chains suspended from the windlass, but heavy enough to descend by its own weight. Whenever the frame B is to be raised the windlass C is turned so that the ropes or chains are wound upon it. In one end of the frame B are the bearings of the crank-shaft D by which the saws are driven, and of the driving-shaft E to which the motion is first imparted, gear-wheels $e\ e$ connecting these two shafts. A pitman, $f$, connects the crank of the shaft D with the saw-carriage F, which slides horizontally in the frame B, between guide-plates or rails $g\ g$ attached thereto. The guide-plates or rails $g$ are slotted to be laterally adjustable on the frame B, in order that they may be set to steady the carriage without creating undue friction and to follow up any wear of or by the carriage. The saws G G, of which a suitable number can be used, are fastened to the end of the carriage F by a transverse pin, $h$, and screw-clamp, $i$. The pin $h$ is fitted through all the saw-blades and rested on a projecting rib, $j$, of the carriage and then clamped tight by the piece $i$ by means of screws $l\ l$. Grooves are cut into the rib $j$ and clamp $i$ to receive the saw-blades and hold them steady transversely. The outer ends of the saws are connected with each other by a cross-piece, $m$, and thereby held from swaying and kept the same distance apart.

For operation the frame B is raised by means of the windlass C to bring the saws to the requisite height, so that they will, with their weight and that of the frame B and carriage F, and all appendages, rest on the wood to be cut. The shaft E is then revolved by hand or other means and imparts reciprocating motion to the saw-carriage and saws which while cutting will be automatically fed down; thus the required effect is produced by simple means. A belt or cord, $n$, passing over a pulley on the windlass and around a pulley, $o$, at the lower part of the frame A, serves as a brake for the windlass and to prevent the too rapid descent of the frame B.

Having thus described my invention, I claim as new and desire to secure by Letters Patent—

The rib $j$, clamp $l$, and pin $h$, combined with each other to secure the saws G, to the carriage F, as specified.

M. McCOOL.

Witnesses:
  WM. BLAKE,
  FRANK W. BROWN,
  THOS. P. SHALLCROSS.